United States Patent [19]
Fujii

[11] Patent Number: 6,138,101
[45] Date of Patent: Oct. 24, 2000

[54] METHOD OF ENCODING DIGITAL DATA

[75] Inventor: Osamu Fujii, Higashihiroshima, Japan

[73] Assignee: Sharp Kabushiki Kaisha, Osaka, Japan

[21] Appl. No.: 08/985,060

[22] Filed: Dec. 4, 1997

[30] Foreign Application Priority Data

Jan. 22, 1997 [JP] Japan .................................... 9-009605

[51] Int. Cl.$^7$ ............................... G10L 3/02; G10L 9/00; G10L 7/00
[52] U.S. Cl. ........................... 704/500; 704/229; 704/230
[58] Field of Search ..................................... 704/500, 503, 704/504, 502, 229, 230; 382/239, 246; 369/48–49, 58–59

[56] References Cited

U.S. PATENT DOCUMENTS 5,157,760  10/1992  Akagiri ................................... 704/229
5,553,193   9/1996  Akagiri ................................... 704/229

FOREIGN PATENT DOCUMENTS 5-91061   4/1993  Japan .
5-248972  9/1993  Japan .
7-202823  8/1995  Japan .

*Primary Examiner*—Fan Tsang
*Assistant Examiner*—Robert Louis Sax
*Attorney, Agent, or Firm*—Nixon & Vanderhye P.C.

[57] ABSTRACT

The method of encoding digital data in the present invention enables change of minimum limit of audibility characteristics and/or masking characteristics, which are usually set on the basis of the aural-psychological characteristics of persons with typical hearing, thus changing the allocation of quantized bits to each frequency band and allowing selection of a sound quality which accords with the listener's hearing. The present invention is suitable for ATRAC, a method for compressed encoding for mini-discs.

3 Claims, 6 Drawing Sheets

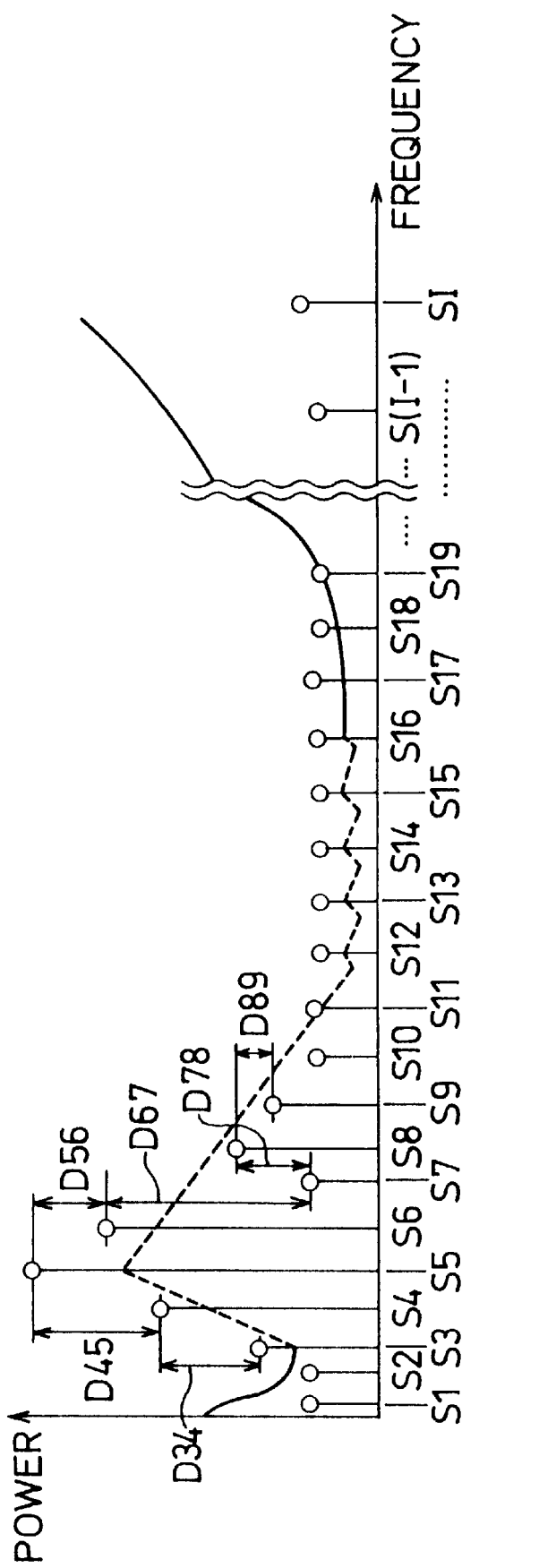

METHOD OF ENCODING DIGITAL DATA

FIELD OF THE INVENTION

The present invention relates to a method of encoding digital data in which, when recording musical tones, sounds, etc. in recording media such as mini-discs, bits are allocated to the spectrum of each frequency band in response to the musical tones, sounds, etc. so as to compress data volume.

BACKGROUND OF THE INVENTION

One method of highly efficient compressed encoding of digital data such as musical tones and sounds is ATRAC (Adaptive Transform Acoustic Coding), used in mini discs. In ATRAC, since the digital data is compressed with high efficiency, it is first broken down into a plurality of frequency bands, then divided into blocks in accordance with time units of variable length, transformed into spectral signals by MDCT (Modified Discrete Cosine Transform) processing, and then each spectral signal is encoded by the number of quantized bits which have been allocated to it, taking into account aural-psychological characteristics.

Among the aural-psychological characteristics which can be applied to the compressed encoding are loudness-level characteristics and masking effect. Loudness-level characteristics show that, even with the same sound pressure level, the loudness of a sound sensed by a person changes according to the frequency of the sound. Accordingly, this shows that the minimum limit of audibility, which shows the smallest loudness which can be heard by a person, changes according to the frequency. As for masking effect, there are two kinds: simultaneous masking effect and elapsed masking effect. Simultaneous masking effect is a phenomenon in which, when several sounds of different frequency composition occur simultaneously, one sound makes another difficult to hear. Elapsed masking effect is a phenomenon in which the masking occurs before and after a loud sound along the time axis of the loud sound.

An example of conventional art which makes use of the elapsed masking effect is Japanese Unexamined Patent Publication No. 5-91061/1993. In this conventional art, when a transient signal is included in one of the frequency conversion time units, bits are allocated in accordance with a word length which varies depending on the energy of previous time units and on the amount of masking, thereby preventing a sound quality deterioration called "pre-echo." Again, Japanese Unexamined Patent Publication No. 5-248972/1993 proposes a technique for improving the efficiency of encoding by using elapsed masking in reference to the spectral distribution of previous time units.

Another example of bit allocation using the aural-psychological characteristics is one called the repetition method, in which actual bit allocation suited to input digital data is performed as follows. First, the power S of each frequency band, and the masking threshold M of that power S on the other frequency bands, are found. Next, from the masking threshold M and the power of quantized noise $N(n)$ (when each frequency band is quantized into n bits), is calculated the ratio of the masking threshold to noise, being $MNR(n)=M/N(n)$. Then, after bit allocation for the frequency band with the smallest ratio of masking threshold to noise $MNR(n)$, that ratio of masking threshold to noise $MNR(n)$ is re-calculated, and bits are allocated to the frequency band with the lowest ratio.

Note that the aural characteristics of persons with typical aural characteristics are the model for the minimum limit of audibility, masking threshold, etc. mentioned above. Accordingly, there are cases where listeners will feel a sense of incongruity due to differences in hearing or preference.

For example, in cases where the spectral composition of the input digital data is comparatively flat, like white noise, bit allocation will be made with the masking threshold at the minimum limit of audibility, so most of the quantized bits will be allocated to the mid- to low-range. Accordingly, depending on the size of the spectral composition, quantized bits may not be allocated to the ultra-low and ultra-high ranges, giving some listeners a sense of incongruity.

Again, when the input digital data is a composite wave composed of a signal with a narrow spectrum band (such as a sine wave signal) and white noise, the frequency bands f1 which include the sine wave signal will have more power, but as for frequency bands f2 which are far from the frequency bands f1, the farther from the frequency bands f1, the greater the drop in power. Accordingly, there will be almost no masking from the sine wave signal at a frequency band f2, and the influence of masking from the power of the frequency band f2 itself is increased. Because of this, there will be no great difference between the ratio of signal to masking threshold (SMR: the ratio of a frequency band's own power S to masking threshold M) at the frequency bands f1 and the same ratio SMR at the frequency bands f2.

In other words, if the power of a signal is S, and the power of quantized noise is $N(n)$ when each frequency band is quantized into n bits, then, based on the relative relationship between the two, the ratio of masking threshold to noise $MNR(n)=M/N(n)=(S/N(n))/(S/M(n))$ will be approximately the same value at the frequency bands f1 and f2. Accordingly, since the conventional adaptive bit allocation methods perform bit allocation based only on the ratio of masking threshold to noise $MNR(n)$, their drawback is that approximately the same number of bits are allocated to the frequency bands f1 and f2.

As a result, if there are many frequency bands f2 which are not influenced by the masking from the sine wave signal, the number of bits allocated to the frequency bands f1 which include the sine wave signal becomes relatively smaller, the quantization error of the sine wave signal becomes greater, and sound quality deteriorates.

In regard to this point, the present Applicant has proposed, in Japanese Unexamined Patent Publication 7-202823/1995, a structure which automatically limits the number of bits which may be allocated to frequency bands with low power S. However, a drawback of this conventional art is that, since the maximum number of bits which may be allocated to each frequency band is determined on the basis of its power, when the power of white noise is large, there are cases when no limitation on bit allocation to that frequency band is made.

SUMMARY OF THE INVENTION

One object of the present invention is to provide a method of encoding digital data capable of attaining a sound quality which accords with the listener's hearing.

Another object of the present invention is to provide a method of encoding digital data capable of preventing deterioration of sound quality even of signals with narrow spectrum bands.

In order to realize the first object mentioned above, the first method of encoding digital data of the present invention encodes digital data such as musical tones and sounds by converting it into frequency domains, dividing the converted spectra into a plurality of frequency bands, changing a minimum limit of audibility characteristic so as to set a masking threshold, and allocating quantized bits for each frequency band in accordance with ratios of masking threshold to noise which are found for each frequency band in accordance with power or energy of each frequency band in consideration of aural-psychological characteristics.

The above structure, by enabling change of the minimum limit of audibility characteristic among aural-psychological characteristics, frees aural-psychological characteristics from definition by the characteristics of persons with typical hearing, and makes possible selection of whether or not to allocate bits to spectra with small inaudible domains, or spectra with ultra-low or ultra-high domains. Accordingly, it becomes possible to respond to persons with superior hearing or to individual, subjective preference, and sound quality which accords with listeners' hearing can be attained.

Next, in order to realize the first object mentioned above, the second method of encoding digital data of the present invention encodes digital data such as musical tones and sounds by converting it into frequency domains, dividing the converted spectra into a plurality of frequency bands, changing a masking characteristic so as to set a masking threshold, and allocating quantized bits for each frequency band in accordance with ratios of the masking threshold to noise for each frequency band which are found in accordance with power or energy of each frequency band in consideration of aural-psychological characteristics.

The above structure, by enabling change of the masking characteristic among the aural-psychological characteristics, frees aural-psychological characteristics from definition by the characteristics of persons with typical hearing, and makes possible selection of whether to allocate bits, for example, to spectra which, for example, suffer masking in a critical band. Accordingly, it becomes possible to respond to persons with superior hearing or to individual, subjective preference, and sound quality which accords with listeners' hearing can be attained.

Next, in order to realize the first object mentioned above, the third method of encoding digital data of the present invention encodes digital data such as musical tones and sounds by converting it into frequency domains, dividing the converted spectra into a plurality of frequency bands, and switching among (i) bit allocation in accordance with ratios of masking threshold to noise which are found for each frequency band in accordance with power or energy of each frequency band in consideration of aural-psychological characteristics, (ii) bit allocation in accordance with a representative value of the power or the energy of each frequency band, and (iii) bit allocation giving weight to each of the foregoing bit allocation methods.

With respect to data, such as white noise having a spectral composition which is comparatively flat, the above structure makes possible bit allocation which is flat along the frequency axis. Again, with respect to data, such as sine wave signals, with narrow band width, the above structure makes possible bit allocation which emphasizes the signal with narrow band width. Accordingly, selection of a sound quality which is suited to the source of the musical tone is made possible.

Finally, the fourth method of encoding digital data of the present invention, in order to realize the second object mentioned above, switches among bit allocation methods (i), (ii), and (iii) described in the third method of encoding digital data in accordance with a relationship between the masking threshold and peaks and local peaks found based on differences in power or energy between adjacent spectra within each frequency band.

The above structure makes it possible to automatically allocate bits according to the method most suited to the digital data, whether it is white noise or other data with wide band width, or sine wave signals or other data with narrow band width, thus preventing deterioration of sound quality, even with musical tones not suited to bit allocation using simultaneous masking such as the masking threshold/noise ratio.

The other objects, features, and superior points of the present invention will be made clear by the description below. Further, the advantages of this invention will be evident from the following explanation in reference to the Figures.

BRIEF DESCRIPTION OF THE DRAWINGS

FIG. 6 is a frequency spectrum diagram for explaining operations for detection of peaks and local peaks in the bit-allocation method shown in FIG. 5.

DESCRIPTION OF THE EMBODIMENTS

The first embodiment of the present invention will be explained below, in reference to FIGS. 1 through 3.

Figure 1:
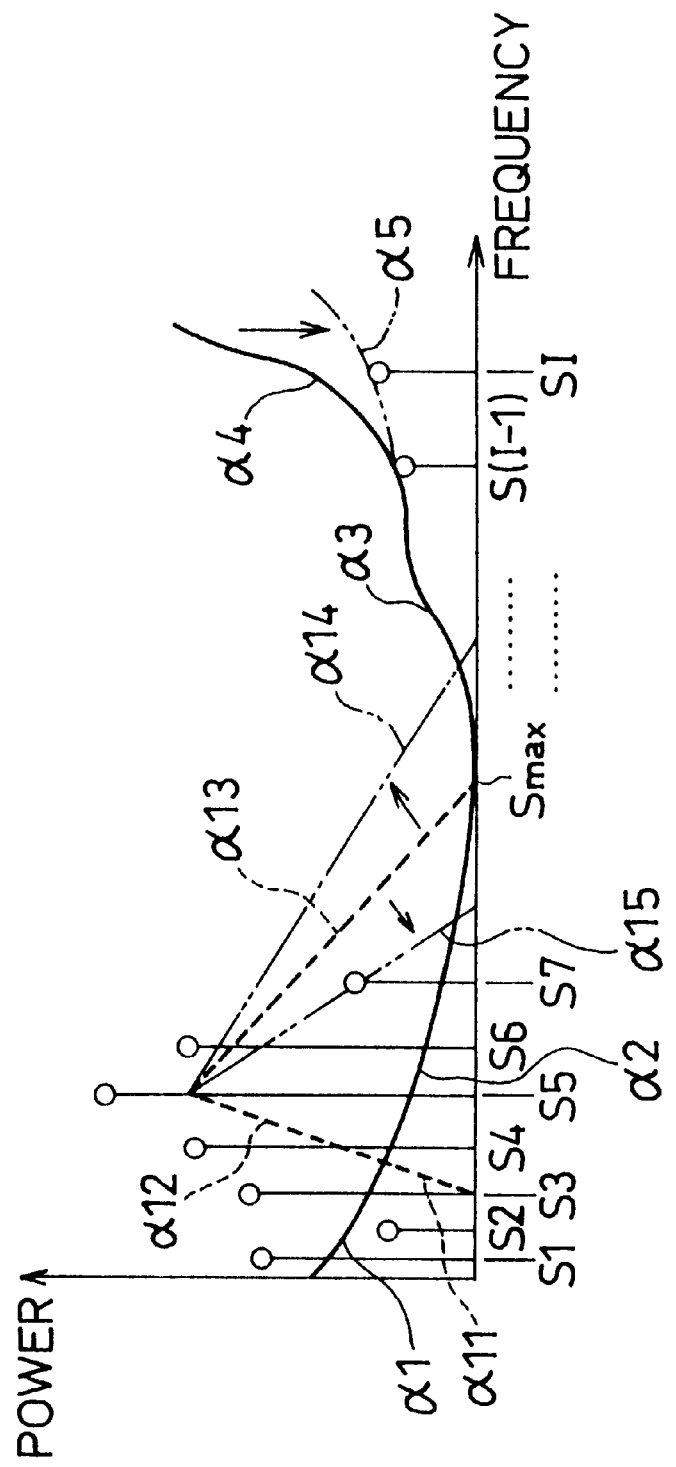
FIG. 1 is a frequency spectrum diagram for explaining the method of encoding according to the first embodiment of the present invention.
Figure 2:
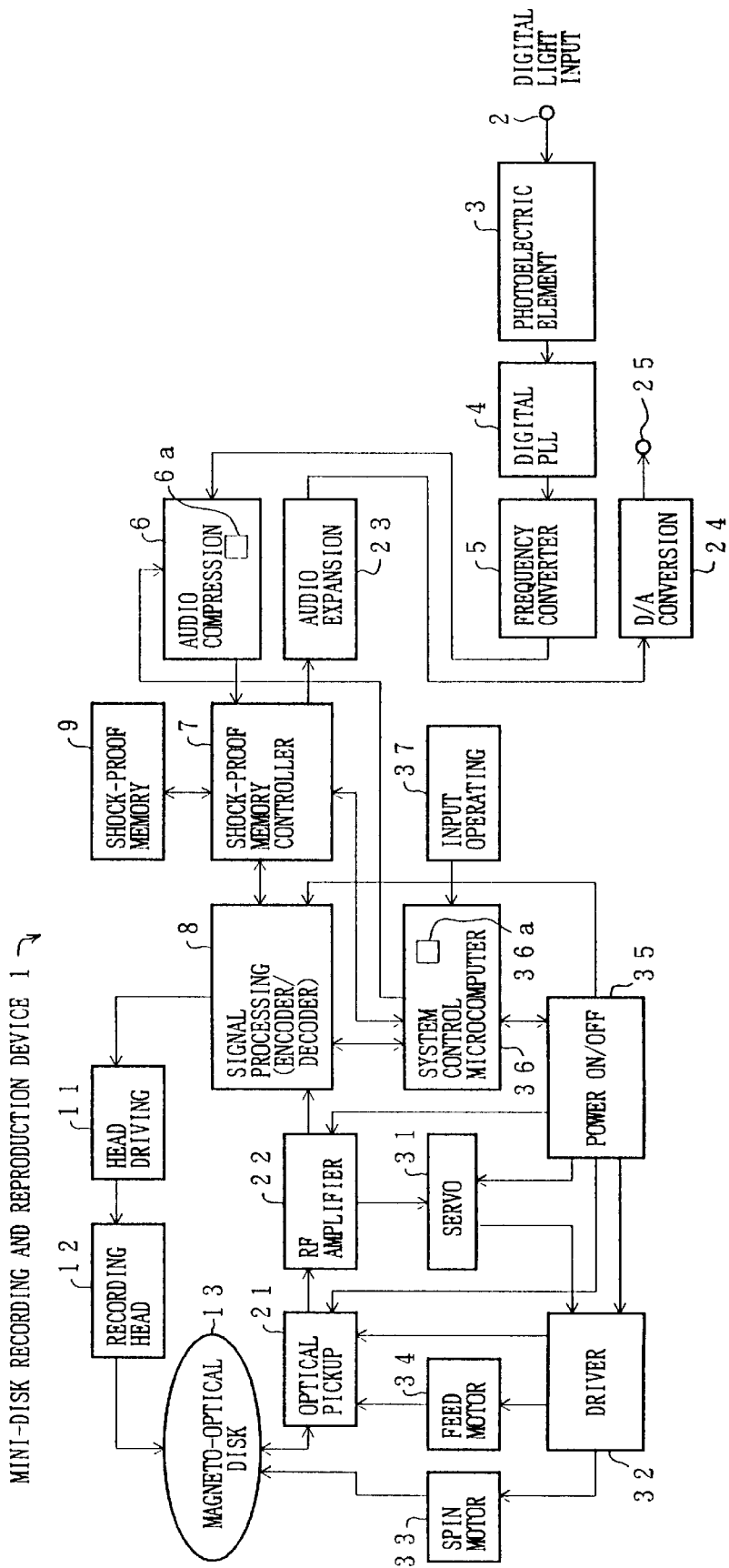
FIG. 2 is a block diagram showing the electrical structure of a mini-disc recording and reproduction device, which is one example of application of the present invention.

FIG. 1 is a frequency spectrum diagram for explaining the method of encoding digital data according to the first embodiment of the present invention, and FIG. 2 is a block diagram showing the electrical structure of a mini-disc recording and reproduction device 1, which is one example of application of the present invention. First, in reference to FIG. 2, the mini-disc recording and reproduction device 1 will be explained. First, digital data, for example in the form of light signals, is serially inputted to an input terminal 2 from a digital audio signal source (not shown) such as a compact disc reproduction device or a satellite broadcast receiver. After the light signals are converted into electric signals by a photoelectric element 3, they are sent to a digital PLL circuit 4. The digital PLL circuit 4 extracts the clock from the digital data, and recreates multibit data corresponding to the sampling frequency and the number of quantized bits. Next, in a frequency conversion circuit 5, the multibit data undergoes sampling rate conversion to the 44.1 kHz conforming to the mini-disc standard from, for example, the 44.1 kHz sampling frequency of compact discs, the 48 kHz sampling frequency of digital audio tape recorders, or the 32 kHz sampling frequency of satellite broadcasts (A mode), and is then sent to an audio compression circuit 6.

The audio compression circuit 6 performs compressed encoding of the input data according to the foregoing ATRAC method. The encoded audio data is sent through a shock-proof memory controller 7 to a signal processing circuit 8. A shock-proof memory 9 is provided in association with the shock-proof memory controller 7. In addition to absorbing the difference in transfer rates between the audio data outputted from the audio compression circuit 6 and the audio data inputted to the signal processing circuit 8, the shock-proof memory 7 also serves to protect the audio data by interpolation of any breaks which occur in the playback signal due to disturbance such as vibration during the playback operation, which will be discussed below.

The signal processing circuit 8 functions as an encoder and decoder, and encodes the audio data as magnetic modulation signals before sending it to a head driving circuit 11. The head driving circuit 11 moves a recording head 12 to the desired recording location on a magneto-optical disc 13, and causes the recording head 12 to emit a magnetic field corresponding to the magnetic modulation signals. At this time, laser light is projected from an optical pickup 21 onto the desired recording location on the magneto-optical disc 13, and a magnetized pattern corresponding to the magnetic field emitted by the recording head 12 is formed on the magneto-optical disc 13.

During the playback operation, on the other hand, serial signals corresponding to the magnetized pattern on the magneto-optical disc 13 are reproduced by the optical pickup 21, and after the serial signals thus reproduced are amplified by a high-frequency (RF) amplifier 22, they are sent to the signal processing circuit 8 and decoded into audio data. After the shock-proof memory controller 7 and the shock-proof memory 9 have eliminated the influence of any disturbance on the decoded audio data, they are sent to an audio expansion circuit 23. The audio expansion circuit 23 performs a conversion process which is the reverse of compressed encoding according to the ATRAC method, and demodulates the audio data into full-bit digital audio signals. The demodulated digital audio signals are converted into analog audio signals by a digital/analog (D/A) conversion circuit 24, and are then outputted from an output terminal 25.

The serial signals amplified by the high-frequency amplifier 22 are also sent to a servo circuit 31. In response to the serial signals which have been reproduced, the servo circuit 31 exerts feedback control on the revolution speed of a spin motor 33 through a driver circuit 32, thus enabling reproduction at the desired linear velocity. The servo circuit 31 also exerts feedback control on the revolution speed of a feed motor 34, thus enabling control of the position of the optical pickup 21 in the radial direction of the magneto-optical disc 13, i.e., control of tracking. Finally, the servo circuit 31 also exerts feedback control on the focusing of the optical pickup 21.

The servo circuit 31, the optical pickup 21, the high-frequency amplifier 22, the signal processing circuit 8, and the driver circuit 32 are energized by a power ON/OFF circuit 35. The power ON/OFF operations of the power ON/OFF circuit 35 and the signal processing operations of the signal processing circuit, which will be discussed below, are centrally managed by a system control microcomputer 36. In association with the system control microcomputer 36 is provided an input operation means, which enables sound-quality selection operations, which will be discussed below, as well as song title input, song selection operations, etc.

Next, the bit allocation method in the first embodiment of the present invention, which is performed according to the ATRAC method by the audio compression circuit 6 of the mini-disc recording and reproduction device 1 structured as described above, will be explained, referring to FIGS. 1 and 3.

In the ATRAC method, the audio data sampled at 44.1 kHz, as mentioned above, is divided into certain frequency bands, specifically a Low frequency band from 0 kHz to 5.5 kHz, a Middle frequency band from 5.5 kHz to 11 kHz, and a High frequency band from 11 kHz to 22 kHz, and the audio data bridging certain time frames for each divided frequency band is converted, by means of the MDCT processing, into an MDCT coefficient, which is the data of one frequency domain. The MDCT coefficients converted in this manner are then converted into spectrum powers Si for i number of frequency bands (i=1, 2, ..., I, with I equal to, for example, 25). Processing like that shown in FIG. 3 is then carried out to allocate quantized bits in accordance with each spectrum power Si thus obtained.

The audio compression circuit 6 includes a table ROM 6a, and in the table ROM 6a are stored masking characteristics and/or minimum limit of audibility characteristics according to the ATRAC method. These minimum limit of audibility characteristics appear as a curve shown by reference symbols $\alpha 1$, $\alpha 2$, $\alpha 3$, and $\alpha 4$ on FIG. 1. The masking characteristics, calculated in accordance with the spectrum powers Si, a critical band width of each frequency band, etc., appear, for a power distribution like that shown in FIG. 1, for example, as a curve shown by reference symbols $\alpha 11$, $\alpha 12$, and $\alpha 13$. The minimum limit of audibility characteristics shown by the reference symbols $\alpha 1$ through $\alpha 4$ and masking characteristics shown by reference symbols $\alpha 11$ through $\alpha 13$ are prepared in accordance with the aural-psychological characteristics of persons with typical hearing characteristics, and are fixed characteristics.

However, in the first embodiment of the present invention, the minimum limit of audibility and/or the masking characteristics can be changed. In concrete terms, for example in the case of the masking characteristics, the greater the spectrum power and the higher the frequency, the larger the range of masking of other frequency bands. In the example in FIG. 1, the maximum limit Smax of the range influenced by spectrum power S5, which is a peak power, is shown by $\alpha 13 \times (1 \pm \Sigma k)$. Here, $\Sigma k$ is a coefficient for weighting. If a plurality of variables k are stored in advance in the table ROM 6a, and the variables k are switched by means of a register 36a in the system control microcomputer 36, the masking characteristic curve $\alpha 13$ can be changed within the range from $\alpha 14$ through $\alpha 15$. The variable k can be set by the listener through the input operating means 37.

For example, by changing the masking characteristic curve from $\alpha 13$ to $\alpha 14$, the band masked is widened, the level of masking is increased, and the number of bits allocated to signals with low power is decreased, or even eliminated. Accordingly, bit allocation to signals of relatively greater power is increased, and the dynamic range of the high-power signals is increased. If, on the other hand, the masking characteristic curve is changed from $\alpha 13$ to $\alpha 15$, bit allocation to low-power signals is increased, and bit allocation to signals of relatively greater power is decreased. Accordingly, the frequency range can be enlarged. The same effect can also be obtained by giving the masking characteristic curve $\alpha 13$ an offset instead of weighting.

In the same way, with regard to the minimum limit of audibility characteristics, the minimum limit of audibility characteristic curve $\alpha 1$ through $\alpha 4$, which is based on the aural-psychological characteristics of persons with typical hearing characteristics, can be weighted or given an offset, thereby changing the $\alpha 4$ portion of the curve, for example, as shown by reference symbol $\alpha 5$. In this way, relatively more bits are allocated to the high-frequency bands.

Next, processing for allocation of quantized bits will be explained, referring to FIG. 3. First, in Step p1, the spectrum power Si of each frequency band is calculated from the sum of squares of the MDCT coefficients for that frequency band (which are obtained by means of the MDCT processing). In Step p2, the audio compression circuit 6 selects, through the register 36a of the system control microcomputer 36, parameters for change of masking characteristics, such as the variables k, which are stored in the table ROM 6a. In Step p3, in the same way as in Step p2, parameters for change of the minimum limit of audibility characteristics are selected.

In Step p4, reference masking characteristics and minimum limit of audibility characteristics previously calculated and stored in the table ROM 6a are changed in accordance with the parameters selected in Steps p2 and p3, and these two characteristics are synthesized in order to determine a final masking threshold. In other words, if the minimum limit of audibility characteristic curve thus changed is as shown by the reference symbols α1, α2, α3, α5, and the masking characteristic curve thus changed is as shown by the reference symbols α11, α12, α14, the curve of the final masking threshold obtained by synthesis will be as shown by the reference symbols α1, α12, α14, α3, α5.

In Step p5, if the index of each frequency band is i, the ratio of the frequency band's spectrum power Si (calculated in Step p1) to its masking threshold Mi (calculated in Step p4) SMRi=Si/Mi is calculated for all frequency bands. On a logarithmic graph, the ratio SMRi for each frequency band will correspond to that part of the length of the spectrum power Si which exceeds the masking threshold Mi.

Next, in Step p6, the ratio of spectrum power Si to the power of quantized noise Ni(n), when the spectrum power Si of each frequency band is quantized into n bits, is calculated: SNR(n)=Si/Ni(n). Statistically, the ratio SNR(n) is a constant in accordance with the characteristics of the signal, so it may be calculated in advance by statistical processing. From the ratio of the ratio SNR(n) to the ratio SMRi can be calculated the ratio of masking threshold to the power of quantized noise, being MNRi(n)=SNRi(n)/SMRi.

In Step p7, the quantized bits are allocated to each frequency band as follows. The number of bits n is increased from 0, and, at each increase, the ratio of masking threshold to power of quantized noise MNRi(n) is calculated for each frequency band, and a bit is allocated to the frequency band where the ratio MNRi(n) is the smallest. In this way, each time the number of quantized bits n is increased, a bit is allocated to the frequency band with the smallest ratio MNRi(n), and if this is repeated until allocation of all available bits is completed, the word length of each frequency band is determined, and this is outputted. In other words, bits are allocated starting with the frequency band in which the length of that part of the spectrum power Si exceeding the threshold Mi is longest.

Thus, bits are allocated in such a way that the masking threshold, as shown in FIG. 1, is changed to accord with the listener's preference.

The foregoing has described the case of change of both the masking characteristics and the minimum limit of audibility characteristics, but the present invention is not limited to such a case; either the masking characteristics or the minimum-audibility characteristics may be changed alone.

In short, change of the minimum limit of audibility characteristics alone, for example, makes it possible to select whether or not to allocate bits to small spectra in the inaudible range or spectra in the ultra-low or ultra-high ranges. Again, change of the masking characteristics only, since it entails change of masking characteristics which are determined by the critical bands in accordance with the power and the frequency of each frequency band, makes it possible to select whether or not to allocate bits to spectra which are masked by spectra with comparatively high power. In this way, sound quality which accords with the hearing of each listener can be obtained.

The second embodiment of the present invention will be explained below, in reference to FIG. 4.

Figure 4:
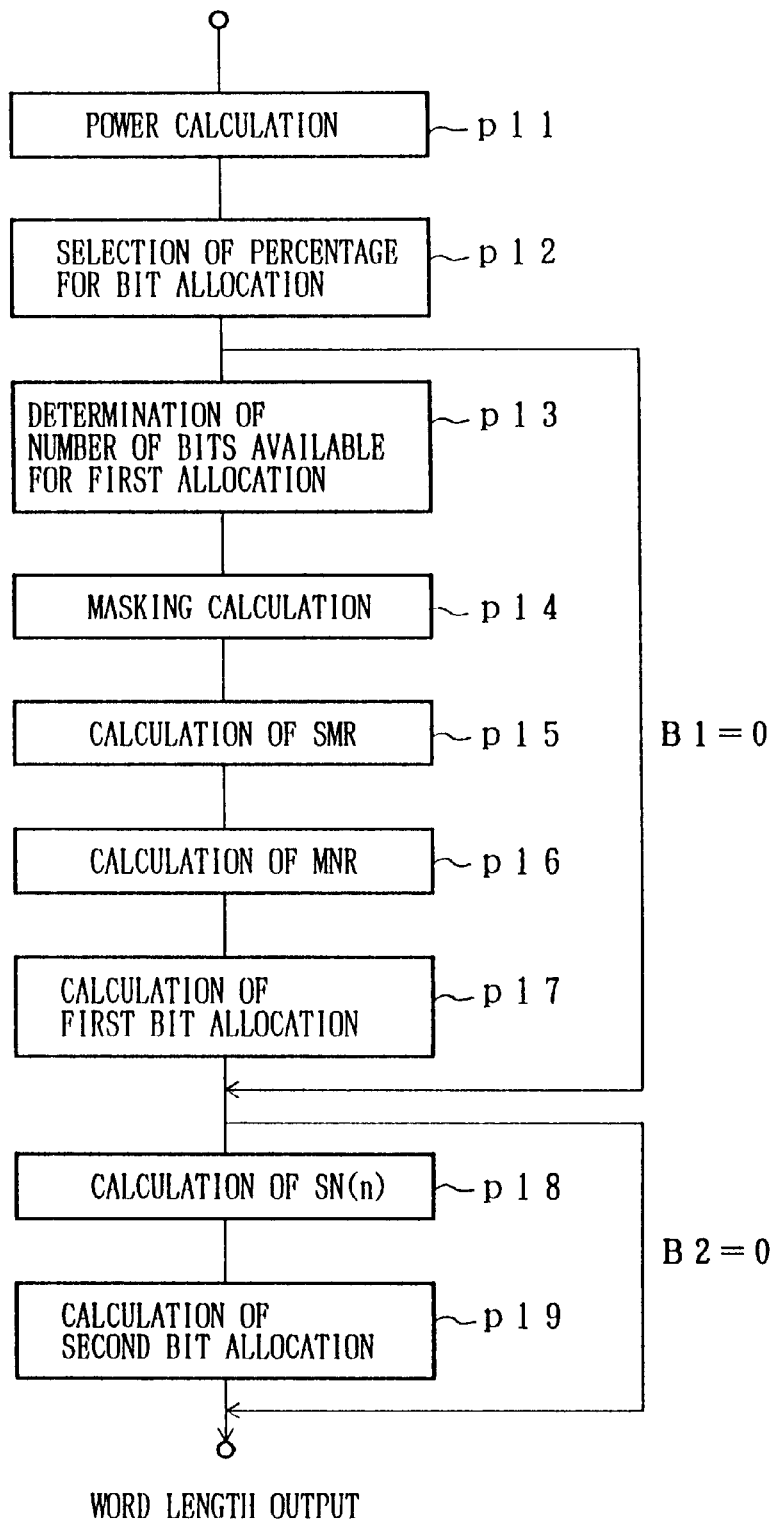
FIG. 4 is a flow-chart for explaining the bit-allocation method according to the second embodiment of the present invention.

FIG. 4 is a flow chart for explaining the bit allocation method in the second embodiment of the present invention. The notable feature of this bit allocation method is that it is possible to set a desired percentage x between (a) the bit allocation according to the ratio of masking threshold to quantized noise MNRi(n) and (b) the bit allocation according to the power of quantized noise SNi(n), when the spectrum power Si, which is a representative value of the power or energy of each frequency band, is quantized into n bits. Several of the percentages x of (a) to (b) are stored in advance in the table ROM 6a of the audio compression circuit 6, and selection among the different percentages x can be performed, through the register 36a of the system control microcomputer 36, in response to the operations from the input operating means 37.

In concrete terms, first, in Step p11, in the same way as in Step p1 in the first embodiment, the spectrum power Si of each frequency band is calculated from the sum of squares of the respective MDCT coefficients. In Step p12, the value in the register 36a of the system control microcomputer 36 is read, and the corresponding percentage x % is selected from the table ROM 6a.

If the percentage x determined in this way is 0, i.e., when the number of bits B1 available for the first allocation is 0, then the bit allocation according to the ratio of masking threshold to quantized noise will not be performed, and the processing proceeds directly to Step p18, which will be discussed below. In contrast, if the number of bits B1 available for the first allocation is not 0, then Step p13 is carried out.

In Step p13, given a total number of mini-disc audio spectrum data bits B0 (1,144 to 1,464 bits), the number of bits B1 available for the first allocation in accordance with the ratio MNRi(n) is calculated: B1=B0×(x/100).

In Step p14, in accordance with previously-calculated masking characteristics and minimum limit of audibility characteristics corresponding to the aural-psychological characteristics of persons with typical hearing, a masking threshold, i.e., the curve α1, α12, α13, α3, α4, is calculated. Then, in Steps p15 and p16, as in Steps p5 and p6 above, the ratio of masking threshold to power of quantized noise MNRi(n) for each frequency band is calculated from the ratio SMRi of the frequency band's spectrum power Si to its masking threshold Mi. In Step p17, bit allocation is performed in the same way as in Step p7 above, but the total number of bits allocated in Step p17 is the number of bits available for the first allocation B1, as calculated in Step p12 above.

In Step p18, the power of quantized noise SNi(n) is calculated, and in Step p19, bits are allocated to the frequency band with the highest power of quantized noise SNi(n). Thereafter, the power of quantized noise SNi(n) is re-calculated, bits are allocated to the band where this value is highest, and this is repeated until all bits available for the second allocation B2=B0(1−(x/100)) have been allocated. Steps p18 and p19 are carried out when the number of bits available for the first allocation is 0 and the processing has proceeded directly from Step p12 to Step p18, or when x does not equal 100, but when x does equal 100, i.e., when B2=0, the word-length is outputted directly after Step p17.

In cases when the input signal is a composite wave of a sine wave signal and white noise, and in other cases where it resembles a single sine wave, for example with a solo piano piece, if the bit allocation is performed only according to the ratio of masking threshold to quantized noise MNRi (n), many bits will be allocated to noise elements with low power, and the error in quantizing of the piano becomes relatively great. However, if the bit allocation percentage x can be changed as outlined above, the bit allocation according to the power of quantized noise SNi(n) is carried out in addition to that according to the ratio of masking threshold to quantized noise MNRi(n), thereby ensuring that the number of bits allocated to the piano can be increased, the error in quantizing of the piano is reduced.

Again, if the input signal is composed of sound with many local peaks and noise, for example an orchestra piece, the bit allocation can be performed in accordance with the ratio of masking threshold to quantized noise MNRi (n), in which the noise and the musical tones composing small local peaks in bands close to large signals can be masked, thus allocating no bits to them, and more bits can be allocated to large signals which are not masked. This enables high fidelity recording.

Further, with input signals lying between the foregoing two examples, which are composed of a musical tone with three or four local peaks and noise, for example a solo clarinet piece, by giving weight both to the bit allocation according to the ratio of masking threshold to quantized noise MNRi(n) and to the bit allocation according to the power of quantized noise SNi(n), fidelity of the clarinet can be improved.

In this way, the bit allocation method most suited to any musical tone source can be selected.

The third embodiment of the present invention will next be explained, in reference to FIGS. 5 and 6.

Figure 5:
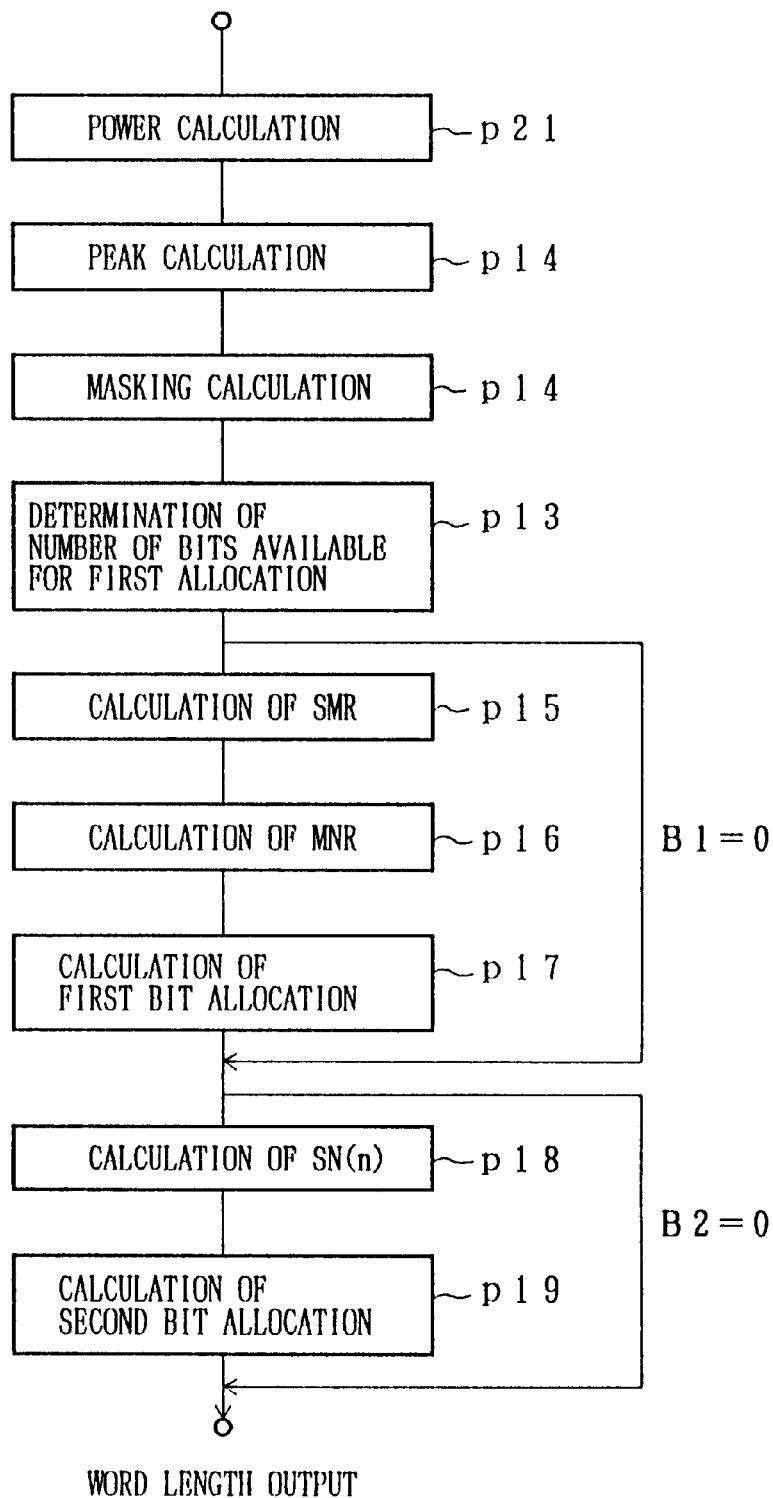
FIG. 5 is a flow-chart for explaining the bit-allocation method according to the third embodiment of the present invention.

FIG. 5 is a flow chart for explaining the bit allocation method in the third embodiment of the present invention. The notable feature of this bit allocation method is that the percentage x of (a) the bit allocation according to the ratio of masking threshold to quantized noise MNRi(n) to (b) the bit allocation according to the power of quantized noise SNi(n) is automatically determined on the basis of the relationship between (1) peaks and local peaks in spectrum powers Si and (2) masking thresholds.

First, the peak value among the spectrum powers of all frequency bands from S1 to SI, such as that shown by reference symbol S5 on FIG. 6, is found. Then a masking threshold, such as that shown on FIG. 6, which includes masking characteristics due to that peak level, is found. Next, local peaks such as that shown by reference symbol S8 on FIG. 6 are found for each frequency band. The number of such local peaks masked by the masking threshold, and the number of such local peaks not so masked, are respectively found, and the ratio between masked local peaks and unmasked local peaks determines the percentage x.

In other words, if the total number of local peaks is NM, and the number of masked local peaks is M, then:

$$M/(NM+1)=0 \quad (1)$$

Accordingly, if there are no masked local peaks, the percentage x will be 0% and the number of bits available for the first allocation B1 will be set at 0. If, on the other hand, $$0<M/(NM+1)\leq 0.5 \quad (2)$$

then x is from 50% to 90%, and if $$0.5<M/(NM+1) \quad (3)$$

then x is 100%, and the number of bits available for the first allocation B1 will be the entirety of total available bits B0.

Here the detection of local peaks and the selection of the percentage x will be discussed. The local peaks are found for all the frequency bands after the peak spectrum power (S5 in FIG. 6) is found. In the example in FIG. 6, the difference D34, D45, . . . , D89 and its polarity between each spectrum power S3 to S9 within a certain number of frequency bands from peak value S5 (in the example in FIG. 6, two frequency bands on the low-frequency side and four on the high-frequency side) is found, and the local peaks are detected on the basis of change in polarity and the absolute value of those differences. In this way, the local peaks are found across all frequency bands. In concrete terms, in the case of FIG. 6, there is only one local peak (S8), and that local peak is masked by the masking threshold; thus M/(NM+1)=1/(1+1)=0.5. Accordingly, equation (2) above will be applied, and a percentage x=50% to 90% will be selected.

Next, the bit allocation method of the third embodiment will be explained in reference to FIG. 5.

In this bit allocation method, after the spectrum power Si of each frequency band has been calculated in Step p21 as in Step p11 and Step p1 above, the peak value is found in Step p22, and the masking threshold including the masking characteristics of that peak value is found in Step p23. In Step p24, the percentage x is calculated by means of equations (1) through (3) above, and the number of bits available for the first allocation B1 is calculated. Then, in Steps p25 through p27, as in Steps p15 through p17 above, the first bit allocation, according to the ratio of masking threshold to quantized noise MNRi(n), is performed, and then in Steps p28 and p29, as in Steps p18 and p19 above, the second bit allocation, according to the power of quantized noise SNi(n), is performed.

In this way, a bit allocation with high sound quality appropriate to the musical tones like that shown in FIG. 4 can be performed automatically, and deterioration of sound quality, even with respect to musical tones not suited to the bit allocation according to the ratio of masking threshold to quantized noise MNRi(n), can be prevented.

The foregoing explains the case in which the percentage x is calculated by means of equations (1) through (3) above (the preferred case), but the present invention need not be limited to this case. A similar effect may be obtained by calculation of the percentage x by means of equations (1) and (3).

Figure 3:
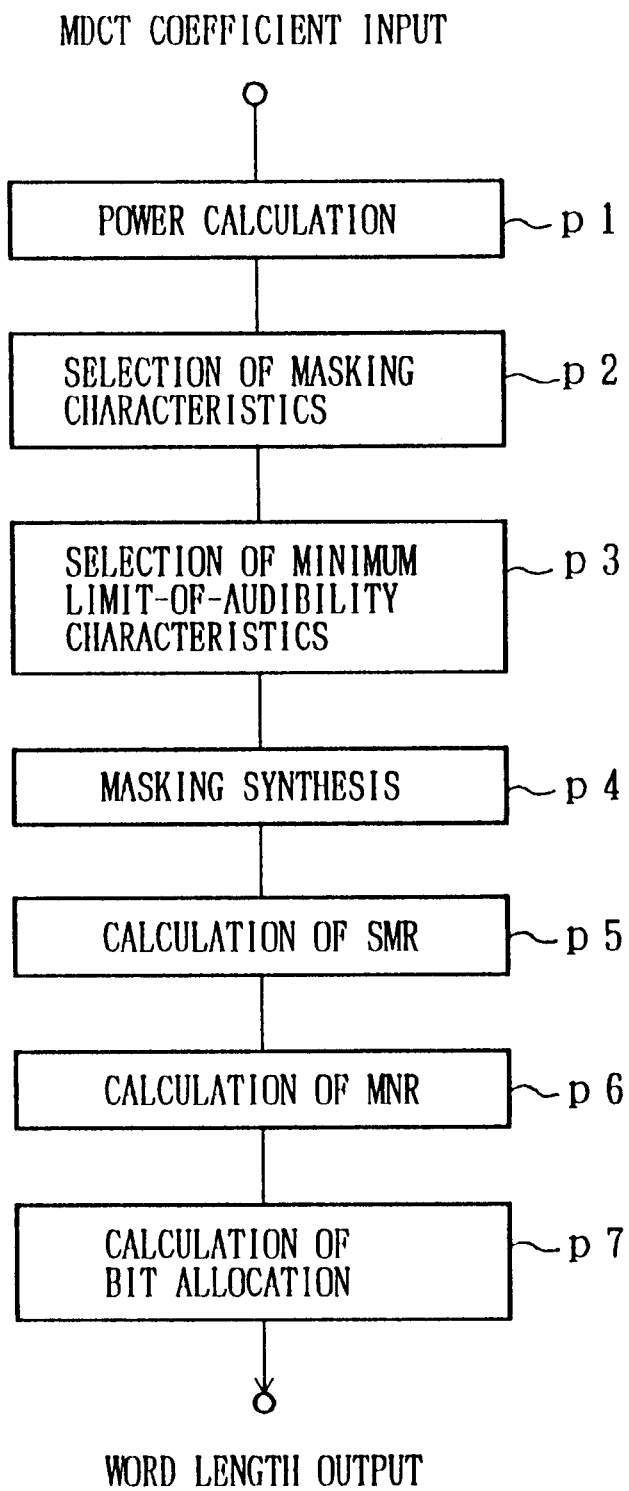
FIG. 3 is a flow-chart for explaining the bit-allocation method according to the first embodiment of the present invention.

The change of the minimum limit of audibility and/or masking characteristics shown in FIGS. 1 and 3 above may also be applied to the bit allocations shown in FIGS. 4 and 5.

The concrete embodiments and examples of implementation discussed in the foregoing detailed explanations of the present invention serve solely to illustrate the technical details of this invention, and the present invention should not be narrowly interpreted within the limits of such concrete examples, but rather may be applied in many variations without departing from the spirit of this invention and the scope of the patent claims set forth below.

What is claimed is:

1. A method of encoding digital data in which the digital data is converted into a frequency spectrum, the frequency spectrum is divided into frequency bands, and quantized bits are allocated to each frequency band, said method comprising the steps of:

setting a percentage for allocation of the quantized bits, the percentage being changeable; and (i) performing a first allocation of the quantized bits in accordance with ratios of masking threshold to noise which are found for each frequency band in accordance with power or energy of each frequency band in consideration of aural-psychological characteristics; and (ii) performing a second allocation of the quantized bits in accordance with a representative value of the power or energy of each frequency band;

wherein said steps (i) and (ii) are performed in accordance with the percentage so as to allocate the total number of quantized bits, thereby allocating the number of the quantized bits of each frequency band;

and further wherein the percentage corresponds, if NM is the total number of the local peaks, with a ratio of the number M of the local peaks which are masked by the masking threshold to the number N of the local peaks which are not masked by the masking threshold.

2. The method of encoding digital data according to claim 1, wherein:

the percentage is set to 0% when $M/(NM+1)=0$ is satisfied; and the percentage is set to 100% when $0.5<M/(NM+1)$ is satisfied.

3. A method of encoding digital in which digital data such as musical tones and sounds is converted into frequency domains, the converted spectra are divided into a plurality of frequency bands, and bits are allocated for each frequency band so as to perform the encoding, said method comprising the steps of:

(i) performing a first allocation of the quantized bits in accordance with ratios of masking threshold to noise which are found for each frequency band in accordance with power or energy of each frequency band;

(ii) performing a second allocation of the quantized bits in accordance with a representative value of the power or the energy of each frequency band; and (iii) performing a third allocation of the quantized bits giving weight to the bit allocation methods of each of said steps (i) and (ii);

wherein said steps (i), (ii), and (iii) are switchable;

and further wherein said steps (i), (ii), and (iii) are switched in accordance with a relationship between the masking threshold and peaks and local peaks found based on differences in power or energy between adjacent spectra within each frequency band.

* * * * *